United States Patent
Chen

(10) Patent No.: US 11,177,527 B2
(45) Date of Patent: Nov. 16, 2021

(54) BATTERY LOWER CASING AND BATTERY SYSTEM

(71) Applicants: Jiangsu Contemporary Amperex Technology Limited, Jiangsu (CN); Contemporary Amperex Technology Co., Limited, Ningde (CN)

(72) Inventor: Yuchao Chen, Jiangsu (CN)

(73) Assignees: Jiangsu Contemporary Amperex Technology Limited, Changzhou (CN); Contemporary Amperex Technology Co., Limited, Ningde (CN)

(*) Notice: Subject to any disclaimer, the term of this patent is extended or adjusted under 35 U.S.C. 154(b) by 177 days.

(21) Appl. No.: 16/552,298

(22) Filed: Aug. 27, 2019

(65) Prior Publication Data

US 2021/0020877 A1    Jan. 21, 2021

(30) Foreign Application Priority Data

Jul. 15, 2019  (CN) .......................... 201921098475.3

(51) Int. Cl.
*H01M 50/20* (2021.01)
*B60L 50/64* (2019.01)

(52) U.S. Cl.
CPC ............ *H01M 50/20* (2021.01); *B60L 50/64* (2019.02); *B60Y 2200/91* (2013.01); *B60Y 2400/112* (2013.01); *H01M 2220/20* (2013.01)

(58) Field of Classification Search
None
See application file for complete search history.

(56) References Cited

U.S. PATENT DOCUMENTS

| 953,600 A | 3/1910 | Edens | |
|---|---|---|---|
| 5,881,517 A * | 3/1999 | Prince | E04H 1/1266 52/238.1 |

(Continued)

FOREIGN PATENT DOCUMENTS

| CN | 1783541 A | 6/2006 |
|---|---|---|
| CN | 205050889 U | 2/2016 |

(Continued)

OTHER PUBLICATIONS

Sentry Supply 656-1833, available May 9, 2017 <<https://www.amazon.co.uk/Sentry-Supply-656-1833-Bracket-Stainless/dp/B01MRT695V>> (Year: 2017).*

(Continued)

*Primary Examiner* — Alix E Eggerding
(74) *Attorney, Agent, or Firm* — Law Offices of Liaoteng Wang

(57) ABSTRACT

The disclosure relates to a battery lower casing and a battery system. The battery lower casing includes: a bottom plate; a plurality of fixing beams sequentially connected end to end and fixed to the bottom plate; a cross beam disposed between the oppositely disposed fixing beams; and a supporting bracket including a base plate and limiting portions, wherein the limiting portions are connected to the base plate and disposed opposite to each other, the base plate and the oppositely disposed limiting portions enclose and form a recess, the base plate is connected to the fixing beam and an end portion of the cross beam adjacent to the fixing beam is embedded in the recess such that the cross beam is connected to the fixing beam.

9 Claims, 5 Drawing Sheets

(56) References Cited

U.S. PATENT DOCUMENTS

| | | | |
|---|---|---|---|
| 9,533,600 B1 | 1/2017 | Schwab et al. | |
| 2014/0196394 A1* | 7/2014 | Greeson | B60J 10/80 52/404.2 |
| 2017/0355255 A1* | 12/2017 | Brausse | B62D 27/023 |
| 2018/0050607 A1 | 2/2018 | Matecki et al. | |
| 2018/0154754 A1* | 6/2018 | Rowley | B60K 1/04 |

FOREIGN PATENT DOCUMENTS

| | | |
|---|---|---|
| CN | 108063197 A | 5/2018 |
| CN | 207474545 U | 6/2018 |
| CN | 108461685 A | 8/2018 |
| CN | 109768200 | 5/2019 |
| CN | 209658262 U | 11/2019 |
| CN | 110571378 A | 12/2019 |
| CN | 210110876 U | 2/2020 |
| WO | 2015149660 | 10/2015 |

OTHER PUBLICATIONS

Stainless Steel Square Base Long Neck Floor Flange, available Dec. 11, 2015 <<https://www.amazon.com/Stainless-Square-Flange-Component-Intermediate/dp/B01996QLR6>> (Year: 2015).*

The first examination report dated Jul. 3, 2020 for European Application No. 19195137.5, 4 pages.

PCT International Search Report for PCT/CN2020/095758, dated Sep. 16, 2020, 11 pages.

The extended European search report dated Feb. 19, 2020 for European Application No. 19195137.5, 6 pages.

* cited by examiner

BATTERY LOWER CASING AND BATTERY SYSTEM

CROSS-REFERENCE TO RELATED APPLICATION

This application is based on and claims priority to Chinese Patent Application No. 201921098475.3 filed on Jul. 15, 2019, which is incorporated herein by reference in its entirety.

FIELD

The present disclosure relates to the technical field of power battery, and in particular to a battery lower casing and a battery system.

BACKGROUND

As new energy electric vehicles get popularized and increased market recognition, traffic accidents of new energy vehicles are also increasing year by year, which will cause greater personal injury and property loss and become one of the important factors restricting the development of new energy sources.

In accidents, serious problem may occur in the battery system of the new energy vehicle due to crash and deformation, such as internal system components damage, high voltage leakage, short circuit spontaneous combustion and even explosion, which brings great challenges to accident rescue. Therefore, how to improve the safety of the battery system of new energy vehicle has become an urgent problem to be solved.

SUMMARY

According to embodiments of the disclosure, there is provided a battery lower casing and a battery system, wherein the battery lower casing has a good impact resistance.

In one aspect, embodiments of the disclosure provide a battery lower casing including: a bottom plate; a plurality of fixing beams sequentially connected end to end and fixed to the bottom plate; a cross beam disposed between the oppositely disposed fixing beams; and a supporting bracket including a base plate and limiting portions, wherein the limiting portions are connected to the base plate and disposed opposite to each other, the base plate and the oppositely disposed limiting portions enclose and form a recess, the base plate is connected to the fixing beam and an end portion of the cross beam adjacent to the fixing beam is embedded in the recess such that the cross beam is connected to the fixing beam.

According to an aspect of embodiments of the disclosure, the base plate includes a first bearing portion and second bearing portions, wherein the first bearing portion and the oppositely disposed limiting portions enclose and form the recess, and the second bearing portions are located at two outer sides of the recess.

According to an aspect of embodiments of the disclosure, a reinforcing portion is disposed between the second bearing portion and the limiting portion.

According to an aspect of embodiments of the disclosure, the reinforcing portion is a polygonal plate, wherein one edge of the reinforcing portion is connected to the limiting portion, and another edge is connected to the second bearing portion.

According to an aspect of embodiments of the disclosure, the reinforcing portion, the second bearing portion and the limiting portion form a hollow triangular prism structure.

According to an aspect of embodiments of the disclosure, the first bearing portion has a thickness larger than that of the second bearing portion, and the first bearing portion is hollow inside.

According to an aspect of embodiments of the disclosure, the supporting bracket further includes connecting portions which are connected to the base plate and disposed opposite to each other, and the connecting portions and the limiting portions are alternately connected end to end to form a ring structure.

According to an aspect of embodiments of the disclosure, the base plate is a planar plate or a curved plate.

According to an aspect of embodiments of the disclosure, the recess has a width W1, the end portion of the cross beam has a width W2, and there is a difference t between the widths of the recess and the end portion, which satisfies $1 \text{ mm} \leq t \leq 3 \text{ mm}$; and there is a distance h between the end portion of the cross beam and a bottom of the recess, which satisfies $1 \text{ mm} \leq h \leq 5 \text{ mm}$.

In one aspect, embodiments of the disclosure provide a battery system including: any of the battery lower casings as described above; a cover which covers the fixing beams of the battery lower casing and forms at least two accommodating chambers with the cross beam; and a plurality of battery modules accommodated in the accommodating chambers.

The battery lower casing according to embodiments of the disclosure provides the supporting bracket between the fixing beam and the cross beam. The base plate of the supporting bracket is connected to the fixing beam, and the cross beam is embedded in the recess which is enclosed by a portion of the base plate and the oppositely disposed limiting portions. Therefore, the impact force on the battery lower casing can be scattered and attenuated, the impact resistance of the battery lower casing can be improved, and the battery lower casing has a simple structure and can be manufactured conveniently. Furthermore, the battery system according to embodiments of the disclosure adopts the battery lower casing as described above, which can reduce degree of potential damage inside the battery system and improve the safety and reliability of the battery system. When the battery system is applies in a new energy vehicle, it is beneficial to improve the anti-side-collision performance of the new energy vehicle. Thereby, the spontaneous combustion and electric leakage accidents of the battery system can be avoided or retarded, and more valuable rescue time for life and property can be provided.

BRIEF DESCRIPTION OF THE DRAWINGS

Features, advantages, and technical effects of exemplary embodiments of the disclosure will be described below with reference to accompanying drawings.

Figure 1:
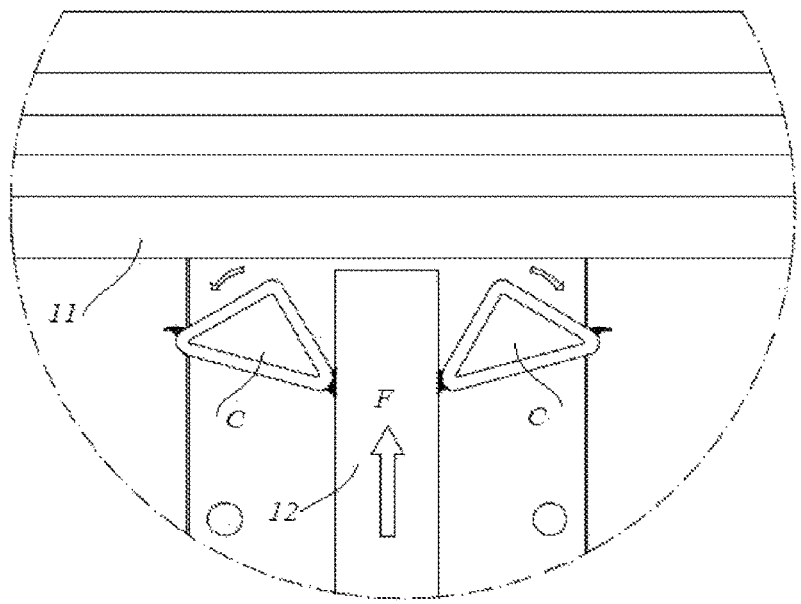
FIG. 1 is a schematic diagram of a battery lower casing in prior art when it is impacted.

REFERENCE SIGNS IN THE DRAWINGS 1 battery lower casing;
11 fixing beam;
12 cross beam;
121 end portion;
13 supporting bracket;
131 base plate;
131a first bearing portion;
131b second bearing portion;
130 positioning hole;
132 limiting portion;
133 recess;
134 reinforcing portion;
135 connecting portion;
14 bottom plate;
C fixing frame;
2 cover;
3 battery module.

In the drawings, same components are denoted by same reference numerals. The views are not necessarily plotted in actual proportion in the drawings.

DETAILED DESCRIPTION

Various exemplary embodiments, features, and aspects of the disclosure will be described in detail below. In the detailed descriptions, a number of specific details are described to provide a complete understanding of the disclosure. However, it is obvious to the person skilled in the art that the disclosure may be implemented without some of these specific details. The following descriptions of the embodiments merely intend to provide better understanding of the disclosure by illustrating examples of the disclosure. In the drawings and the descriptions below, at least some of well-known structures and techniques are not shown to avoid unnecessarily obscuring the disclosure. For clarity, some structural dimensions may be exaggerated. Furthermore, the features, structures, or characteristics described hereinafter may be combined in any suitable manner in one or more embodiments.

The orientation indicated in the following description refer to directions shown in the drawings, and are not intended to limit the specific structure of the disclosure. In the description of the disclosure, it should be noted that, unless otherwise stated, the terms "installation" and "connect" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance. Moreover, the terms "first", "second", and the like are configured for descriptive purposes only and are not to be construed as indicating or implying relative importance or number of relative features. Therefore, a feature defined with the terms "first" and "second" may explicitly or implicitly include at least one of the feature.

As shown in FIG. 1, in a battery lower casing of prior art, a fixing beam 11 and a cross beam 12 are connected through fixing frames C. The fixing frame C may be an L-shaped or triangular support. One edge of the fixing frame C is connected with the cross beam 12, and another edge is connected to the fixing beam 11. One or more fixing frames C are respectively disposed on both sides of the cross beam 12. Since the fixing frames C on both sides of the cross beam 12 are independently connected to the fixing beam 11, when the battery lower casing 1 receives a lateral impact force F from outside, the respective fixing frames C on both sides may be easily turned outward relative to the fixing beam 11. Thereby, the impacted cross beam 12 is directly in contact with the fixing beam 11 or even penetrates the fixing beam 11, such that the impact energy cannot be effectively absorbed, and severe inner deformation of the battery system and even major safety accident may occur.

To this end, the disclosure provides a battery lower casing 1 which has at least good impact resistance. The battery lower casing and the battery system according to embodiments of the disclosure are described in detail below with reference to FIG. 2 to FIG. 10.

Figure 2:
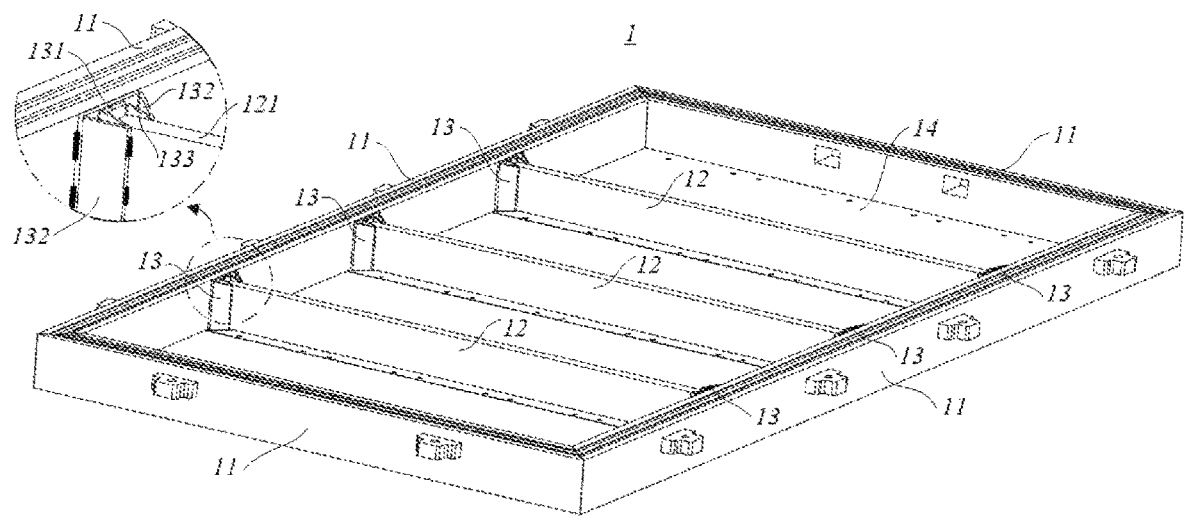
FIG. 2 is a structural schematic diagram of a battery lower casing according to the disclosure.
Figure 3:
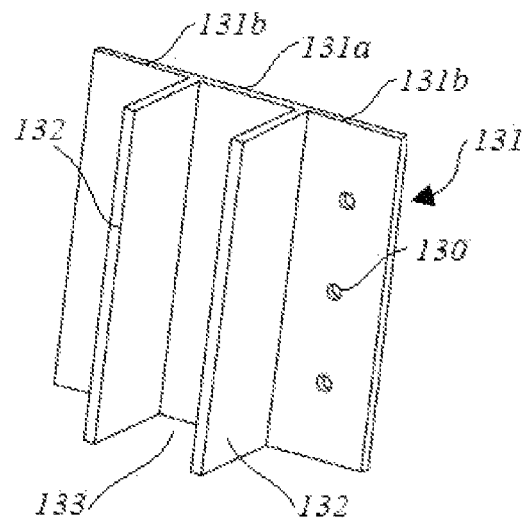
FIG. 3 is a structural schematic diagram of a supporting bracket of the battery lower casing as shown in FIG. 2.

Referring to FIG. 2 and FIG. 3, a battery lower casing 1 according to an embodiment of the disclosure includes: a plurality of fixing beams 11, a cross beam 12, a supporting bracket 13 and a bottom plate 14.

The fixing beams 11 are sequentially connected end to end, and fixed to the bottom plate 14. The cross beams 12 are disposed between the oppositely disposed fixing beams 11.

The bottom plate 14 is a plate made of aluminum alloy or carbon steel. Optionally, the fixing beam 11 and the cross beam 12 can be aluminum alloy profiles, or may be made of materials such as carbon steel, aluminum alloy, magnesium alloy, aluminum magnesium alloy or the like. Their molding process includes, but not limited to, for example die casting, extrusion, casting and the like. The fixing beams 11 can be integrally formed through welding, riveting or screws such that the battery lower casing 1 will have reduced weight while satisfying its structural strength.

The supporting bracket 13 includes a base plate 131 and limiting portions 132, wherein the limiting portions 132 are connected to the base plate 131 and disposed opposite to each other. The base plate 131 and the oppositely disposed limiting portions 132 enclose and form a recess 133. The base plate 131 is connected to the fixing beam 11 and an end portion 121 of the cross beam 12 adjacent to the fixing beam 11 is embedded in the recess 133 such that the cross beam 12 is connected to the fixing beam 11.

The supporting bracket 13 can be made of a metal material such as carbon steel, aluminum alloy, magnesium alloy, aluminum magnesium alloy and the like. Its molding process includes, but not limited to, for example die casting, extrusion, casting and the like. The base plate 131 of the supporting bracket 13 and the fixing beam 11 may be connected through welding, riveting or bolts. The end portion 121 of the cross beam 12 extends into the recess 133 and is welded to the limiting portion 132.

According to embodiments of the disclosure, at least a portion of the base plate 131 and the oppositely disposed limiting portions 132 enclose and form a recess 133 which surrounds the end portion 121 of the cross beam 12, such that the fixing beam 11 and the cross beam 12 are connected to form a whole structure. When the battery lower casing 1 is subjected to a lateral impact force from outside, the supporting bracket 13 can generally absorb the lateral impact force without being split, and the lateral impact force is transmitted back and forth between the oppositely disposed fixing beams 11 through the cross beam 12 and finally scattered and attenuated. Also, since the base plate 131 is located between the cross beam 12 and the fixing beam 11, the cross beam 12 can be prevented from penetrating the fixing beam 11 during the impact, and the impact resistance of the battery lower casing 1 is improved.

The battery lower casing 1 according to the embodiment of the disclosure provides the supporting bracket 13 between the fixing beam 11 and the cross beam 12. The base plate 131 of the supporting bracket 13 is connected to the fixing beam 11, and the cross beam 12 is embedded in the recess 133 which is enclosed by the base plate 131 and the oppositely disposed limiting portions 132. Therefore, the impact force on the battery lower casing 1 can be scattered and attenuated, the impact resistance of the battery lower casing 1 can be improved, and the battery lower casing 1 has a simple structure and can be manufactured conveniently.

Specific structure of the supporting bracket 13 will be described in further detail below with reference to the accompanying drawings.

Referring to FIG. 3, the base plate 131 includes a first bearing portion 131a and second bearing portions 131b. The first bearing portion 131a and the oppositely disposed limiting portions 132 enclose and form the recess 133. The second bearing portions 131b are located at two outer sides of the recess 133.

Optionally, the base plate 131 is a planar plate. The base plate 131 is welded to the fixing beam 11. In order to ensure the connection reliability, the second bearing portion 131b may be provided with a positioning hole 130 such that the second bearing portion 131b can be riveted or screwed to the fixing beam 11. The connection strength between the base plate 131 and the fixing beam 11 is improved.

Since the first bearing portion 131a of the base plate 131 and the oppositely disposed limiting portions 132 enclose and form the recess 133 and the second bearing portions 131b are located at two outer sides of the recess 133, the mounting area of the base plate 131 and the fixing beam 11 is larger than the cross-sectional area of the cross beam 12, and it is not easy for the supporting bracket 13 to turn toward either side of the cross beam 12 when the supporting bracket 13 is subjected to an impact force from outside. The impact force on the battery lower casing 1 can be advantageously absorbed and scattered, and the impact resistance of the battery lower casing 1 is further improved.

Figure 4:
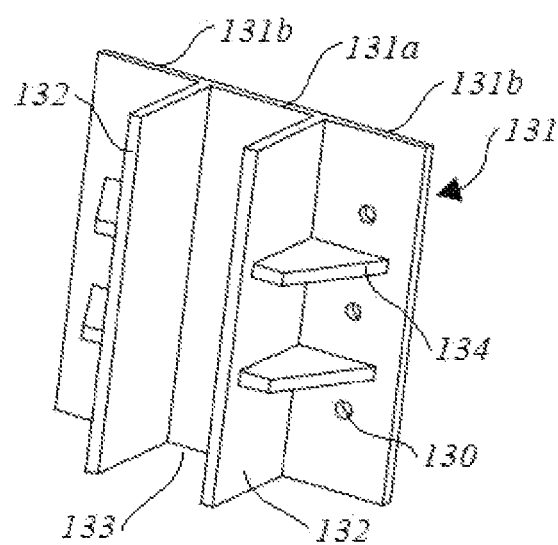
FIG. 4 is a structural schematic diagram of another supporting bracket of the battery lower casing as shown in FIG. 2.

FIG. 4 shows another supporting bracket 13 which is similar in structure to the supporting bracket 13 shown in FIG. 2, except that a reinforcing portion 134 is disposed between the second bearing portion 131b and the limiting portion 132. Thereby, the structural rigidity and strength of the supporting bracket 13 are improved.

The reinforcing portion 134 is a polygonal plate. One edge of the reinforcing portion 134 is connected to the limiting portion 132, and another edge is connected to the second bearing portion 131b. There may be one or more reinforcing portions 134. Two or more reinforcing portions 134 are spaced apart to prevent the limiting portion 132 from being locally deformed. Optionally, the number of the reinforcing portions 134 is the same on each outer sides of the recess 133. It ensures the force balance of the supporting bracket 13 on both sides of the cross beam 12, prevents the limiting portion 132 from overturning, and improves the structural rigidity and strength of the supporting bracket 13. Furthermore, the impact resistance of the battery lower casing 1 is improved.

Figure 5:
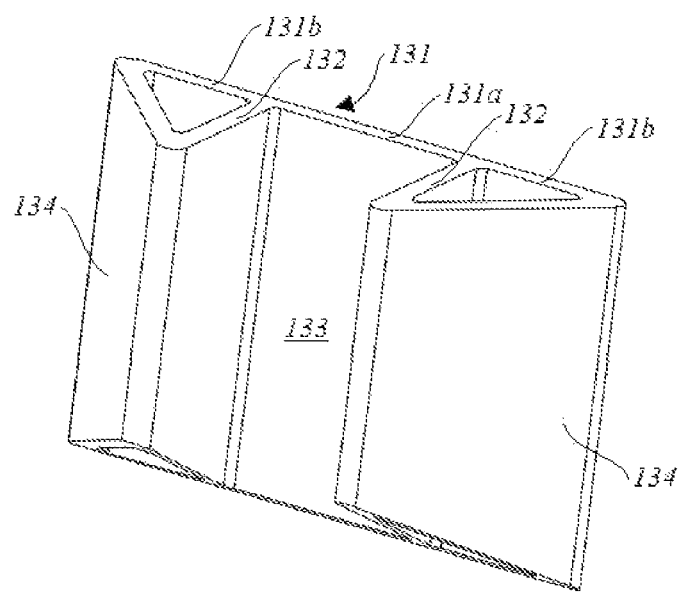
FIG. 5 is a structural schematic diagram of another supporting bracket of the battery lower casing as shown in FIG. 2.

FIG. 5 shows another supporting bracket 13 which is similar in structure to the supporting bracket 13 shown in FIG. 4, except for the structure of the reinforcing portion 134.

As shown in FIG. 5, the reinforcing portion 134 connects an end portion of the second bearing portion 131b and an end portion of the limiting portion 132, so that the reinforcing portion 134, the second bearing portion 131b and the limiting portion 132 form a hollow triangular prism structure. The structural rigidity and strength of the supporting bracket 13 are further improved with respect to the reinforcing portion 134 in FIG. 4.

Figure 6:
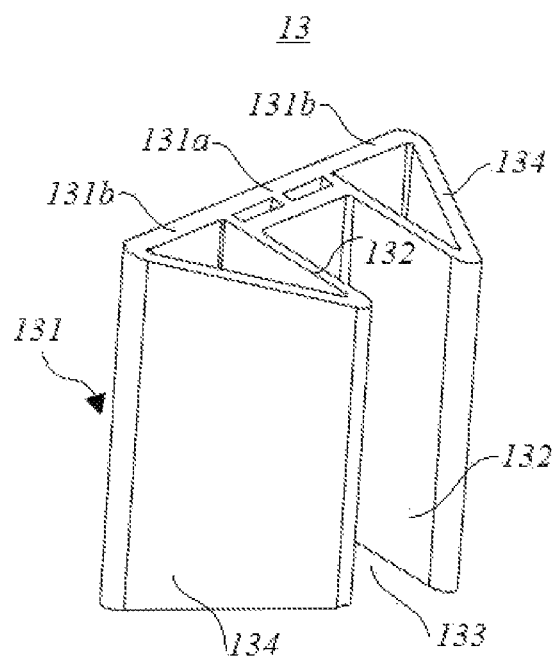
FIG. 6 is a structural schematic diagram of another supporting bracket of the battery lower casing as shown in FIG. 2.

FIG. 6 shows another supporting bracket 13 which is similar in structure to the supporting bracket 13 shown in FIG. 5, except that the first bearing portion 131a has a thickness larger than that of the second bearing portion 131b and the first bearing portion 131a is hollow inside.

When the supporting bracket 13 is subjected to an impact force from outside, the cross beam 12 repeatedly hits the first bearing portion 131a. When the first bearing portion 131a has an increased thickness and is hollow inside, the base plate 131 can bear an increased repeated impact force from the end portion 121 of the cross beam 12, and the structural rigidity and strength of the supporting bracket 13 are improved.

Figure 7:
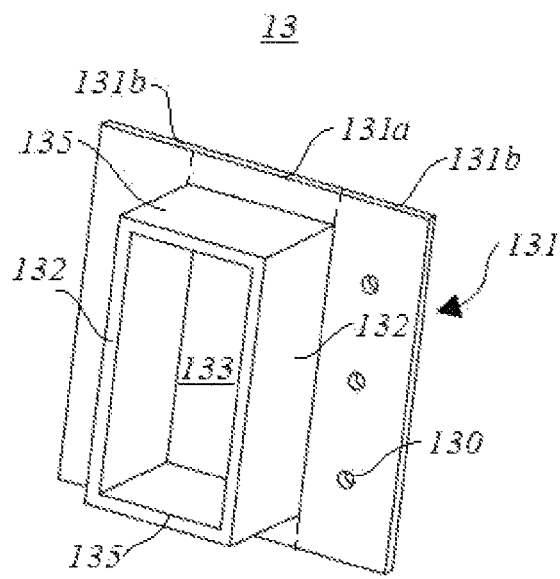
FIG. 7 is a structural schematic diagram of another supporting bracket of the battery lower casing as shown in FIG. 2.

FIG. 7 shows another supporting bracket 13 which is similar in structure to the supporting bracket 13 shown in FIG. 2, except that the supporting bracket 13 further includes connecting portions 135 which are connected to the base plate 131 and disposed opposite to each other. The connecting portions 135 and the limiting portions 132 are alternately connected end to end to form a ring structure.

Therefore, the oppositely disposed connecting portions 135 can restrict the cross beam 12 from swinging up and down along the recess 133, and thereby the connection strength between the cross beam 12 and the limiting portion 132 can be further improved.

Optionally, the ring structure has a box shape with an opening, and the connection between the connecting portion 135 and the limiting portion 132 is smoothly transitioned to prevent scratching of operators.

Optionally, a reinforcing portion 134 is disposed between the second bearing portion 131b and the limiting portion 132. The reinforcing portion 134 can be, for example, a polygonal plate as shown in FIG. 4. Therefore, the structural strength and rigidity of the supporting bracket 13 can be further improved, and thereby the impact resistance of the battery lower casing 1 can be improved.

Figure 8:
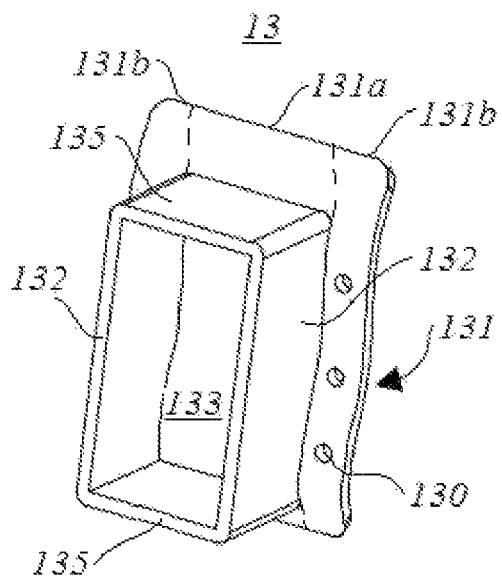
FIG. 8 is a structural schematic diagram of another supporting bracket of the battery lower casing as shown in FIG. 2.

FIG. 8 shows another supporting bracket 13 which is similar in structure to the supporting bracket 13 shown in FIG. 7, except that the base plate 131 is a curved plate. The curved plate may be a wave-shaped plate or an arced plate. Accordingly, the impact force transmitted between the cross beam 12 and the oppositely disposed fixing beams 11 can be buffered, the time by which the impact force is scattered and attenuated can be shortened, and the impact resistance of the battery lower casing 1 can be improved.

It can be understood that the supporting bracket 13 can also be any combination of the above features. For example, the base plates 131 in FIG. 3 to FIG. 7 can also be a curved plate, which will not be described in detail here.

Figure 9:
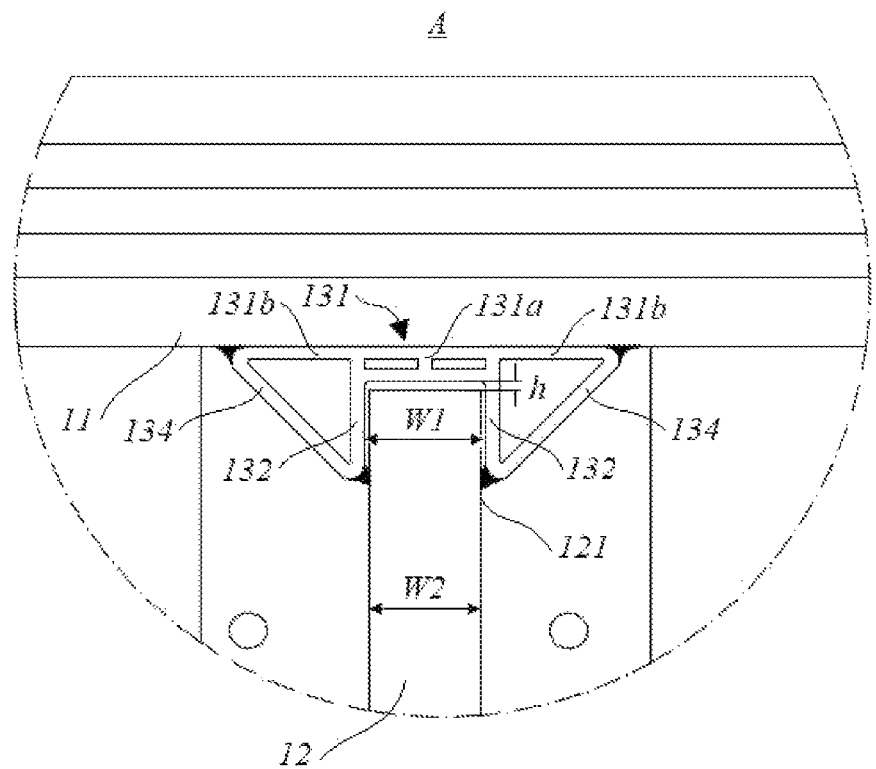
FIG. 9 is a schematic diagram of an assembly of the supporting bracket as shown in FIG. 6, a fixing beam and a cross beam.

Referring to FIG. 9, since there are inevitable manufacturing tolerances in the fixing beam 11 and the cross beam 12, a mounting gap exists between the cross beam 12 and the fixing cross beam 12. The supporting bracket 13 can compensate for the mounting gap. Thereby, the manufacture feasibility of the battery lower casing 1 can be improved.

Specifically, in any of the supporting brackets 13 as described above, the recess 133 has a width W1, and the end portion 121 of the cross beam 12 has a width W2. There is a difference t between the widths of the recess 133 and the end portion 121 of the cross beam 12, which satisfies the following condition: $1 \text{ mm} \leq t \leq 3 \text{ mm}$. If t is not in the above range, the fitting of the cross beam 12 with the recess 133 may be too tight for installation, or too loose such that the welding strength of the cross beam 12 and the limiting portion 132 may be adversely affected.

Furthermore, there is a distance h between the end portion 121 of the cross beam 12 and a bottom of the recess 133, which satisfies the following condition: $1 \text{ mm} \leq h \leq 5 \text{ mm}$. If h is not the above range, the gap between the cross beam 12 and the bottom of the recess 133 may be too small for installation, or too large such that the connecting strength of the cross beam 12 and the supporting bracket 13 may be adversely affected.

Figure 10:
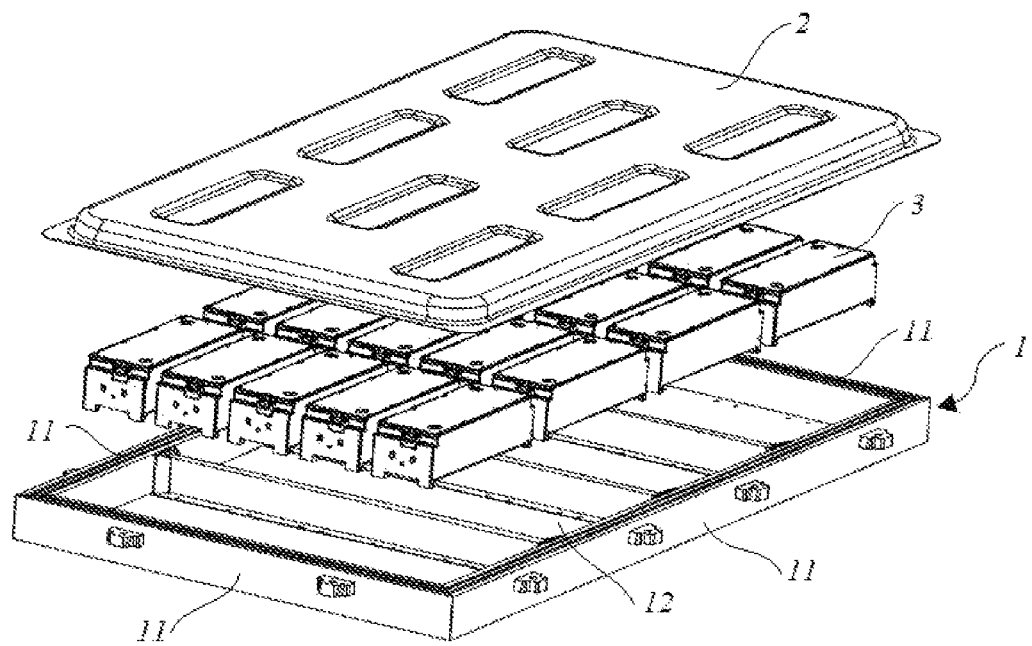
FIG. 10 is a structural schematic diagram of a battery system according to the disclosure.

Referring to FIG. 10, embodiments of the disclosure further provide a battery system including any of the battery lower casings 1 as described above, a cover 2, and a plurality of battery modules 3.

The cover 2 covers the fixing beams 11 of the battery lower casing 1, and forms at least two accommodating chambers with the cross beam 12. The battery modules 3 are accommodated in the accommodating chambers. The greater the number of cross beams 12, the greater the number of accommodating chambers, in which more battery modules 3 can be accommodated.

The battery system according to embodiments of the disclosure adopts the battery lower casing 1 as described above, which can reduce degree of potential damage inside the battery system and improve the safety and reliability of the battery system. When the battery system is applies in a new energy vehicle, it is beneficial to improve the anti-side-collision performance of the new energy vehicle. Thereby, the spontaneous combustion and electric leakage accidents of the battery system can be avoided or retarded, and more valuable rescue time for life and property can be provided.

Although the disclosure has been described with reference to the preferred embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but comprises all technical solutions falling within the scope of the claims.

What is claimed is:

1. A battery lower casing comprising:
a bottom plate;
a plurality of fixing beams sequentially connected end to end and fixed to the bottom plate;
a cross beam disposed between the oppositely disposed fixing beams; and
a supporting bracket comprising a base plate and limiting portions, wherein the limiting portions are connected to the base plate and disposed opposite to each other, the base plate and the oppositely disposed limiting portions enclose and form a recess, the base plate is connected to the fixing beam and an end portion of the cross beam adjacent to the fixing beam is embedded in the recess such that the cross beam is connected to the fixing beam,
the base plate comprises a first bearing portion and second bearing portions, wherein the first bearing portion and the oppositely disposed limiting portions enclose and form the recess, and the second bearing portions are located at two outer sides of the recess, wherein
a reinforcing portion is disposed between the second bearing portion and the limiting portion, and
the reinforcing portion, the second bearing portion and the limiting portion form a hollow triangular prism structure,
the first bearing portion has a thickness larger than that of the second bearing portion, and the first bearing portion is hollow inside,
the base plate is a curved plate.

2. The battery lower casing according to claim 1, wherein the recess has a width W1, the end portion of the cross beam has a width W2, and there is a difference t between the widths of the recess and the end portion, which satisfies $1 \text{ mm} \leq t \leq 3 \text{ mm}$.

3. The battery lower casing according to claim 1, wherein there is a distance h between the end portion of the cross beam and a bottom of the recess, which satisfies $1 \text{ mm} \leq h \leq 5 \text{ mm}$.

4. The battery lower casing according to claim 1, wherein the base plate is located between the cross beam and the fixing beam.

5. A battery system comprising:
a battery lower casing according to claim 1;
a cover which covers the fixing beams of the battery lower casing and forms at least two accommodating chambers with the cross beam; and
a plurality of battery modules accommodated in the accommodating chambers.

6. The battery system according to claim 5, wherein the base plate is a planar plate or a curved plate.

7. The battery system according to claim 5, wherein the recess has a width W1, the end portion of the cross beam has a width W2, and there is a difference t between the widths of the recess and the end portion, which satisfies $1 \text{ mm} \leq t \leq 3 \text{ mm}$.

8. The battery system according to claim 5, wherein there is a distance h between the end portion of the cross beam and a bottom of the recess, which satisfies $1 \text{ mm} \leq h \leq 5 \text{ mm}$.

9. The battery system according to claim 5, wherein the base plate is located between the cross beam and the fixing beam.

* * * * *